United States Patent [19]

Ohba et al.

[11] Patent Number: 4,486,694

[45] Date of Patent: Dec. 4, 1984

[54] PROCESS FOR CHANGING A RUNNING DIRECTION OF AN ELECTROMAGNETICALLY GUIDED DRIVERLESS VEHICLE

[75] Inventors: Toshitsugu Ohba; Masanao Murata, both of Ise, Japan

[73] Assignee: Shinko Electric Co., Ltd., Tokyo, Japan

[21] Appl. No.: 380,254

[22] Filed: May 20, 1982

[30] Foreign Application Priority Data

May 22, 1981 [JP] Japan .................. 56-78419
May 22, 1981 [JP] Japan .................. 56-78418

[51] Int. Cl.$^3$ .............................................. G05D 1/00
[52] U.S. Cl. ............................ 318/587; 180/6.5; 364/424; 318/53; 318/65
[58] Field of Search ......... 318/587, 575, 576, 580, 318/647, 53–55, 65, 9, 10; 364/424, 436; 180/6.5, 214, 216, 220

[56] References Cited

U.S. PATENT DOCUMENTS

| | | | |
|---|---|---|---|
| 3,720,281 | 3/1973 | Frownfelter | 318/587 X |
| 3,893,536 | 7/1975 | Marshall et al. | 318/587 |
| 3,970,160 | 7/1976 | Nowick | 180/6.5 |
| 4,226,292 | 10/1980 | Monte et al. | 180/6.5 |
| 4,306,329 | 12/1981 | Yokoi | 180/6.5 X |
| 4,344,498 | 8/1982 | Lindfors | 318/587 X |
| 4,357,562 | 11/1982 | Strouk | 318/587 X |
| 4,379,497 | 4/1983 | Hainsworth et al. | 318/587 X |

Primary Examiner—B. Dobeck
Attorney, Agent, or Firm—Cushman, Darby & Cushman

[57] ABSTRACT

A process for changing a running direction of an electromagnetically guided driverless vehicle is provided which process is applicable to the vehicles of both a single conduction wire guided type and a two conduction wires guided type. The vehicle has right and left drive wheels and independent drive motors for the respective wheels. The drive motor is controlled by a motor speed control device to which steering signals from a route sensors are supplied. The route sensor also delivers an on-route signal to a steering control device which produces a speed setting signal, a steering signal on-off command, and a forward/reverse command for the right/left drive wheels to supply them to the motor speed control device. The process for changing the running direction of the vehicle is characterized in the method of driving the right and left wheels independently with each other forward and reverse according to the turning direction. The vehicle turns round from an old route to a new route at a turning point, thus making a turning radius smaller than that of a conventional curve turning.

10 Claims, 12 Drawing Figures

PROCESS FOR CHANGING A RUNNING DIRECTION OF AN ELECTROMAGNETICALLY GUIDED DRIVERLESS VEHICLE

BACKGROUND OF THE INVENTION

Field of the Invention

The present invention relates to a process for changing a running direction of an electromagnetically guided driverless vehicle. A conventional electromagnetically guided driverless vehicle has right and left drive wheels mounted under the vehicle body at both sides, and front and rear idle wheels mounted at opposite ends of the vehicle with respect to the drive direction. The driverless vehicle is guided by detecting a magnetic field generated by a guide path, such as a conductor wire energized by a high frequency current. The guide path is well known in the art which is comprised of either a single conductor wire forming a closed loop along the whole route on which the driverless vehicle is guided, or two parallel going conductor wires laid on the route in such an arrangement that the current flows through the two parallel going conductor wires in an opposite direction to each other. The above two methods of guiding a driverless vehicle can be applied to the present invention, and in the former case the driverless vehicle has a single route sensor for detecting the magnetic field, while in the latter the driverless vehicle has two route sensors each corresponding to respective two parallel going conductor wires.

Figure 1:
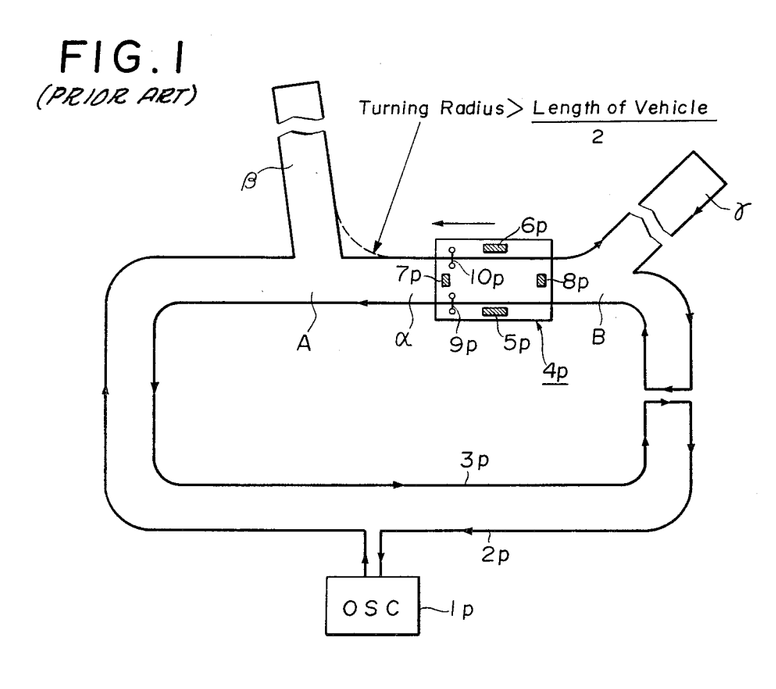
FIG. 1 is a schematic diagram of a typical route arrangement of a guide path comprised of two parallel going conductor wires.

A typical route arrangement adopting the two parallel going conductor wires is illustratively shown in FIG. 1, in which an oscillator 1p drives two parallel going conductor wires 2p and 3p which constitute a guide path along which an electromagnetically guided driverless vehicle 4p is guided. The vechicle 4p has right and left drive wheels 5p and 6p, front and rear idle wheels 7p and 8p, and two route sensors 9p and 10p. According to the prior art technique for changing a running direction of an electomagnetically guided driverless vehicle, there are some disadvantages that when the vehicle 4p is directed at a turning point A to the route β, it is necessary to have at least a turning radius of one half the body length of the vehicle 4p as shown in a dotted line, since the route sensors 9p and 10p must always trace the two parallel conductor wires 2p and 3p. Thus, it has been impossible to turn at the turning point A following the route as shown in a solid line. Furthermore, if it is required to shuttle the vehicle 4p at a route α, the need arises for providing additional pair of route sensors at the opposite side of the route sensors 9p and 10p relative to the longitudinal direction of the vehicle body, thus resulting in a high cost. In addition to the above, if the loading and unloading side is limited only to one side of the vehicle body, the loading and unloading side is confined to one side of the whole route, thus reducing an efficiency of working.

SUMMARY OF THE INVENTION

It is, therefore, a principal object of the present invention to provide a novel process for changing a running direction of an electromagnetically guided driverless vehicle, in which the above disadvantages are fully eliminated.

In summary, the process for changing a running direction according to the present invention resides in that the driverless vehicle is turned to the right or left, or is spun by 180 degree, by driving one of the drive wheels forward and by driving the other of the drive wheels reverse at the turning point. More in particular in FIG. 1, the driverless vehicle 4p is stopped at the turning points A and B when it is required to turn respectively from the route α to β, and from the route α to γ, and then the driverless vehicle 4p is spun making the vehicle body center as a virtual pivot axis. Further, at the ends of the junction routes β and γ, the driverless vehicle 4p is spun at an angle of 180 degree, thus always keeping the route sensors 9p and 10p forward relative to the drive direction of the driverless vehicle 4p.

The electromagnetically guided driverless vehicle comprises:

a route sensor for sensing a guide path, and whose output is used as a steering signal and as an on-route signal outputted when the vehicle is on the guide path, right and left drive wheels mounted on the vehicle, right and left drive motors for energizing the right and left drive wheels, and a motor speed control device for controlling the revolution speed of the right and left drive motors, said motor speed control device receiving the steering signal from the route sensor, and receiving a speed setting signal, a steering signal on-off command, the forward and reverse commands all produced in a steering control device which receives the on-route signal from the route sensor. The electromagnetically guided driverless vehicle utilized for the two parallel going conductor wires system has necessarily two route sensors in stead of a single route sensor.

In a preferred example of the present invention which will be described hereinunder in detail, the process for changing a running direction of an electormagnetically guided driverless vehicle of a single conductor wire guided type comprises the steps of:

(a) turning off the speed setting signal to stop the vehicle at a turning point, (b) supplying the steering signal off command to the motor speed control device, (c) supplying the forward command used for one of the right and left drive wheels to the motor speed control device, and supplying the reverse command used for the other of the right and left drive wheels to the motor speed control device, (d) supplying the speed setting signal to the motor speed control device, (e) detecting the turn off of the on-route signal, (f) detecting the turn on of the on-route signal from its previous turn off state, and (g) turning off the speed control signal to stop the vehicle at a turning point thereby the vehicle being ready to start to move in a new direction.

In another preferred example of the present invention, the process for changing a running direction of an electromagnetically guided driverless vehicle of a two conduction wire guided type comprises the steps of:

(a) turning off the speed setting signal to stop the vehicle at a turning point, (b) supplying the steering signal off command to the motor speed control device, (c) supplying said forward command used for one of said right and left drive wheels to said motor speed control device, and supplying said reverse command used for the other of said right and left drive wheels to said motor speed control device, (d) supplying said speed setting signal to said motor speed control device, (e) detecting a first turn off of the on-route signal
(f) detecting a first turn on of the on-route signal from the first previous turn off state,
(g) detecting a second turn off of the on-route signal from the first previous turn on state
(h) detecting a second turn on of the on-route signal from the second previous turn off state, and
(i) turning off the speed setting signal to stop the vehicle at a turning point thereby the vehicle being ready to start to move in a new direction.

The foregoing and other objects, the features and the advantages of the present invention will be pointed out in, or apparent from, the following description of the preferred embodiments considered together with the accompanying drawings.

DETAILED DESCRIPTION OF THE PREFERRED EMBODIMENTS

Figure 2:
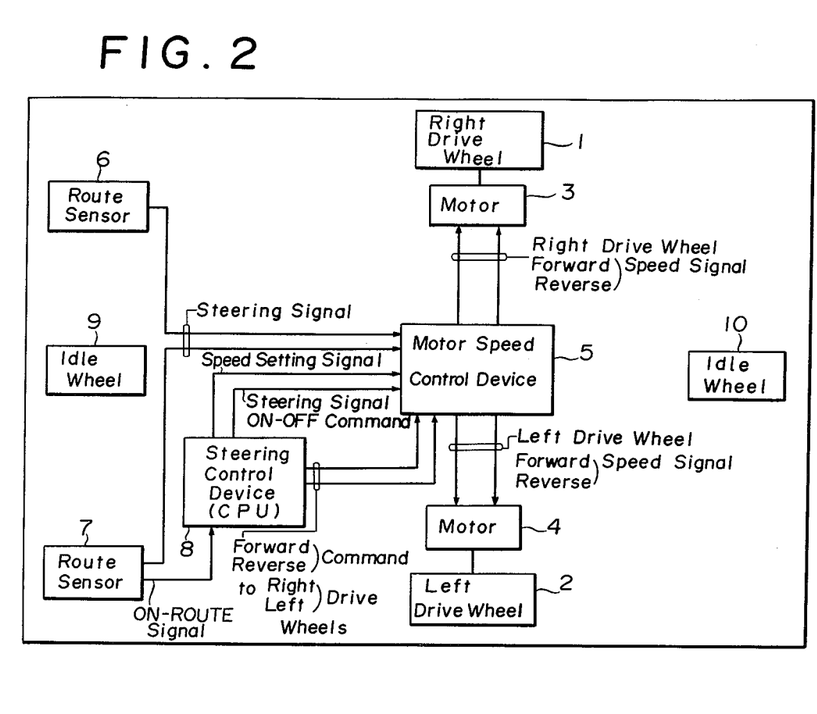
FIG. 2 is a schematic block diagram illustrating an electromagnetically guided driverless vehicle which is guided by a process according to the present invention.

Referring now to FIG. 2, an electromagnetically guided driverless vehicle (herein after referred to as simply "vehicle" where applicable) is shown diagrammatically. The vehicle is comprised of right and left drive wheels 1 and 2 mounted centrally of the both sides of the vehicle body, and front and rear idle wheels 9 and 10 at the opposite ends of the vehicle body relative to the longitudinal direction thereof. The right and left drive wheels 1 and 2 have right and left driving motors 3 and 4 with driving shafts connected to respective wheels 1 and 2. The right and left driving motors 3 and 4 are rotated independently in accordance with forward or reverse speed signal delivered from a motor speed control device 5.

The vehicle is provided with a pair of, or right and left route sensors 6 and 7 as shown in FIG. 1 in the case that the vehicle is of a two conduction wires guided type, and is provided with one route sensor in the case that the vehicle is of a single conduction wire guided type. The route sensor senses a magnetic field radiated from a guide path made of either one or a pair of route sensors. The description is first directed to a process for use in a two conduction wires guided type.

The route sensors 6 and 7 sense the guide path, and deliver an output which is used as a steering signal and as an on-route signal outputted when the vehicle is on the guide path, that is, the route sensors 6 and 7 sense the guide path. The motor speed control device 5 receives the steering signals from the route sensors 6 and 7. The on-route signal from either one of the route sensors 6 and 7, illustratively in this embodiment shown as from the route sensor 7, is applied to a steering control device 8 comprised of a central processor unit and other associated circuitries. The steering control device 8 generates, in response to the on-route signal applied thereto, a speed setting signal, an on/off command for the steering signals, and a forward/reverse command for the right and left drive wheels 1 and 2.

With such a construction, the vehicle is guided generally in the following operation. One of the steering signals delivered from the route sensors 6 and 7 is added to a speed setting signal to increase the revolution rate of one of the driving motors 3 and 4, hence the drive wheels 1 and 2. While on the other hand, the speed setting signal is subtracted by the same steering signal to decrease the revolution rate of the other of the driving motors 3 and 4, and hence the drive wheels 1 and 2. Thus, in accordance with the steering signal, the vehicle is controlled to maintain at all times centered correctly on the guide path by making the steering signal to be zero. As a result, the vehicle is driven at a constant speed determined by the speed setting signal along the guide path.

Next, the turning operation, including a change of route to a new junction route from a main straight route, and a change of drive direction by 180 degree, will be described hereinunder in detail which discloses a characteristic feature of the present invention. The turning operation is effected in summary by stopping the vehicle at a turning point, and by inhibiting the supply of the steering signal to the motor speed control device 5 in response to the steering signal on-off command thereby to feed forward and reverse constant speed signal to the respective right and left driving motors 3 and 4 and hence to the right and left drive wheels 1 and 2.

Figure 3:
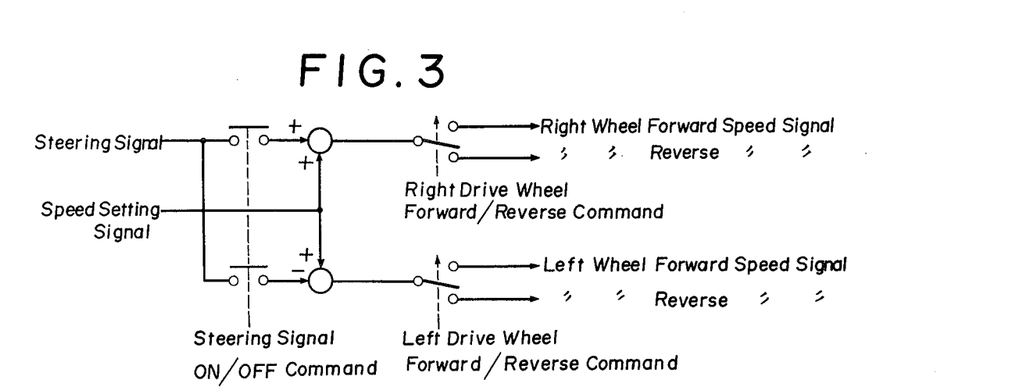
FIG. 3 illustrates a principal circuit operation of a process according to the present invention.

The above principal turning operation is described with reference to particularly to FIGS. 3, 4a to 4c. FIG. 3 shows a principal electrical circuit diagram presented to readily understand the basic concept of the invention, and FIGS. 4a to 4c show an interrelation between the route sensors 6 and 7 and two parallel going conduction wires at the turning point A, and a relation between the on-route signal and the comparator output of the on-route signal relative to the turning angle $\theta$ of the vehicle at the turning point.

In operation, (a) the vehicle is stopped at the turning point A by turning off the speed setting signal in response to an activation of a switch (not shown) which detects the arrival of the vehicle at the turning point. The activation of the switch is accomplished either manually or automatically. (b) Then, the steering signal off command is supplyed to the motor speed control device 5 in order to effect an inhibit of the application of the steering signals from the both route sensors 6 and 7 to the motor speed control device 5. (c) The forward command and reverse command are supplied, in accordance with the turning direction, to the steering control device 8 for further determining which of the right and left wheels 1 and 2 should be driven forward, or vice versa. (d) The speed setting signal is then supplied to the motor speed control device 5 under the control of a central processor unit contained in the steering control device 8.

After the completion of the above step (d), the right and left drive wheels 1 and 2 start to rotate with one of them in a forward direction and with the other of them in a reverse direction in accordance with a turning direction of the vehicle. As a result, the vehicle spins just on the turning point A to move apart from the old route, illustratively shown as a route comprised of conduction wires 6a and 7a, toward a new route, illustratively shown as a route comprised of conduction wires 6b and 7b in FIG. 4a. The vehicle uses for detecting the magnetic field of the respective conduction wires by one of the route sensors 6 and 7, in this embodiment the route sensor 7 being used. The route sensor 7 detects the magnetic field generated by the respective conduction wires 6a, 7a, 6b and 7b to generate the on-route signal. In FIG. 4b, the waveform of the on-route signal obtained when the vehicle turns from the old route to the new route is shown with respect to the turning angle θ, wherein the first pulse at the left side in the figure corresponds to the on-route signal obtained when the route sensor 7 is positioned on the conduction wire 7a, the intermediate pulse corresponding to the on-route signal obtained when the route sensor 7 is positioned on the conduction wire 6a, and the last pulse corresponding to that obtained when the route sensor 7 is positioned on the conduction wire 7b of the new route. The on-route signal output V is compared with a preset threshold voltage Vt in a comparator (not shown), and converted to rectangular pulses shown in FIG. 4c each corresponding to the above pulses in FIG. 4b. Thus, the existence of the rectangular pulse is considered for the route sensor 7 to be positioned on the conduction wire, and contrary to the above, if the rectangular pulse disappears, the route sensor 7 is considered to be away from the conduction wire. The rectangular pulse has a high level voltage H during the existence of the on-route signal higher than the threshold voltage Vt, and has a low level voltage L when the on-route signal level reaches the level lower than the threshold voltage Vt.

Figure 4A:
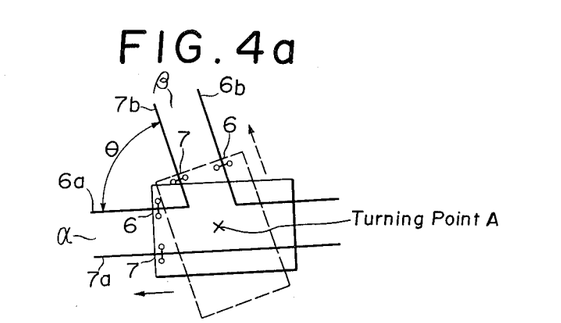
FIG. 4a is a schematic drawing showing an electromagnetically guided driverless vehicle positioned at a turning point A of the guide path.
Figure 4B:
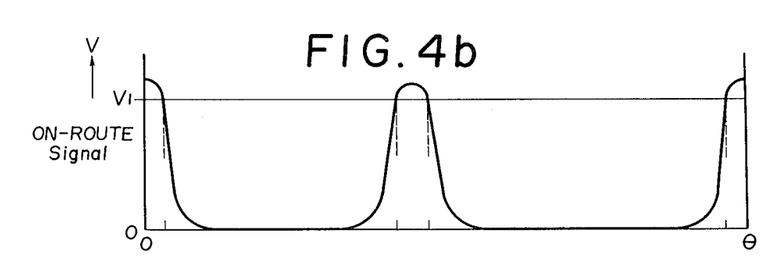
FIGS. 4b and 4c show respectively an on-route signal obtained from either one of route sensors, and a comparator output of the on-route signal in relation to the turning angle $\theta$ around the turning point A.
Figure 4C:
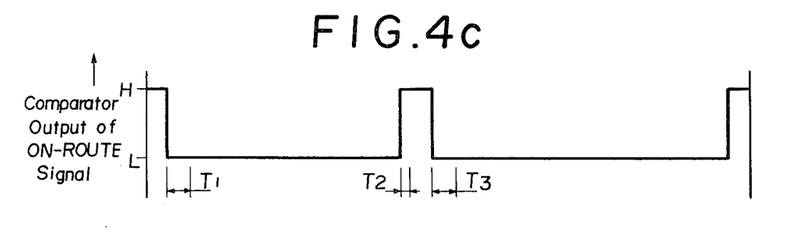

In assuming that the vehicle is turned to the right at the turning point A in FIG. 4a and the route sensor 7 is used for detecting the magnetic field, the following steps are taken succeeding the above step(d) for further effecting a turning operation. (e) The output of the comparator turns to a low level L from the previous high level H. This means that the route sensor 7 and hence the vehicle is turning to the right away from the conductor wire 7a. (f, g and h) Corresponding to the further right turning of the vehicle, the output of the comparator turns to a high level H at the point above the conductor wire 6a, and turns to a low level L until it once again turns to a high level H at the point above the conductor wire 7b. At the time instant when the third occurence of a high level H signal exists, the vehicle is now on the new route. (i) Succeeding the above steps, the speed setting signal is inhibited to be supplied to the motor speed control device 5 in response to the third occurence of the high level H signal. The steering control device 8 then changes the forward and reverse commands supplied in the foregoing step (c) to a forward command in order to feed this command to the motor speed control device 5. Thereafter, the steering signal and speed setting signals are supplied to the motor speed control device 5 for the normal running along the new route at the constant predetermined speed.

It is to be noted here that a turning operation to the new route is completed after detecting the third occurence of the high level H signal, and that this is also true in the case of a turning operation which spins the vehicle at an angle of 180 degree, such as a shuttle turning.

In the above embodiment of the process for changing the drive direction of the vehicle, it is preferable to set certain time intervals such as T1, T2 and T3 as shown in FIG. 4c. These time intervals indicate the time during which the comparator output is held at a previous state of the logical values of H and L for ensuring a reliable detection of the on-route or off-route of the sensor, and hence of the vehicle on the corresponding conduction wire.

Figure 5:
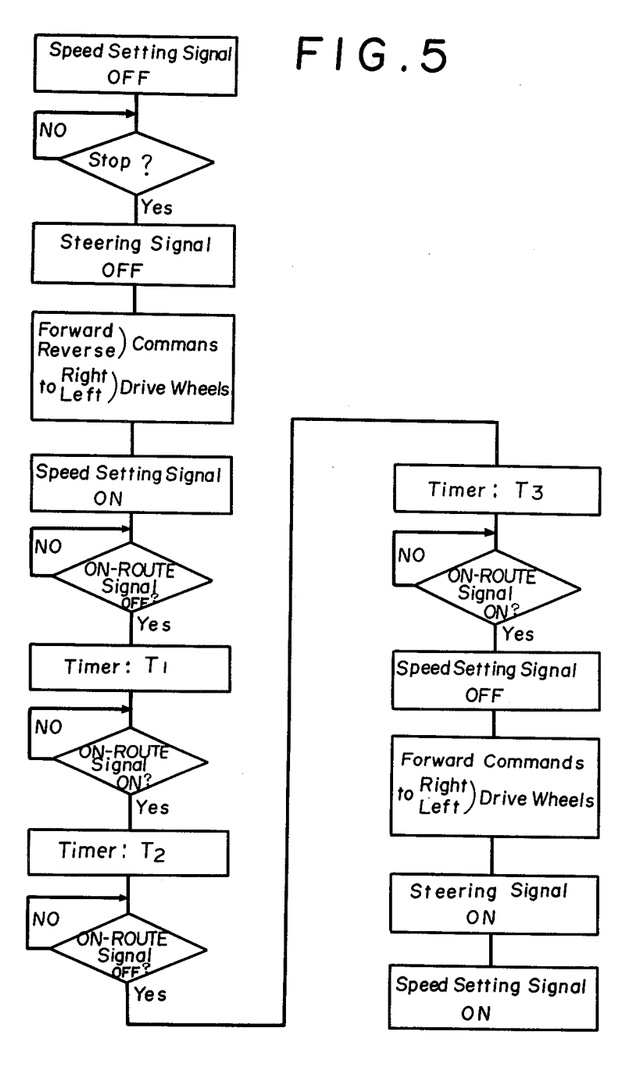
FIG. 5 is a flow chart illustrating a turning operation of the electromagnetically guide driverless vehicle.

FIG. 5 shows a flow chart illustrating the turning operation in accordance with the above steps (a) to (i). The process of changing the drive direction of the vehicle is again described with reference to the flow chart for the better understanding of the invention. When the vehicle arrives at the turning point of such as a junction route, a switch (not shown) is activated either manually or automatically to inhibit the supply of the speed setting signal to the motor speed control device 5, so that the vehicle stops moving. After checking the halt of the vehicle, the steering signals from the route sensor 6 and 7 are inhibited to be supplied to the the motor speed control device 5, the inhibition of the steering signals is maintained until the checking of the vehicle whether it is on the new route or not, that is, the checking of the existence of the third occurence high level H signal.

Upon inhibition of the steering signals, the forward and reverse commands for the respective right and left drive wheels 1 and 2 are supplied to the motor speed control device 5 in accordance with the turning direction of the vehicle. Then, the speed setting signal is supplied to the motor speed control device 5 for setting a revolution speed of the right and left wheels. After the vehicle starts to turn, the on-route signal is monitored as described above until the third occurence high level H signal appears.

Thus, the vehicle rides on the new route, and is subjected to further steps for effecting a normal running operation. The speed setting signal for the turning operation is turned off in order to set a new speed setting signal for a normal running. The new speed setting signal is supplied after supplying to the motor speed control device 5, forward command for the right and left wheels 1 and 2 and steering signals in this sequential order.

Figure 6A:
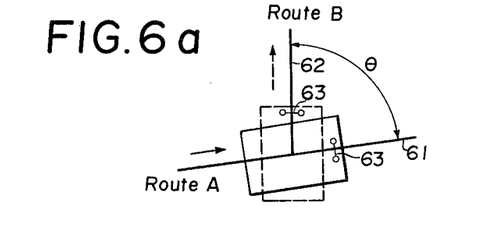
FIG. 6a is a schematic drawing showing an electromagnetically guided driverless vehicle which employs a single conductor wire and has only a single corresponding route sensor.
Figure 6B:
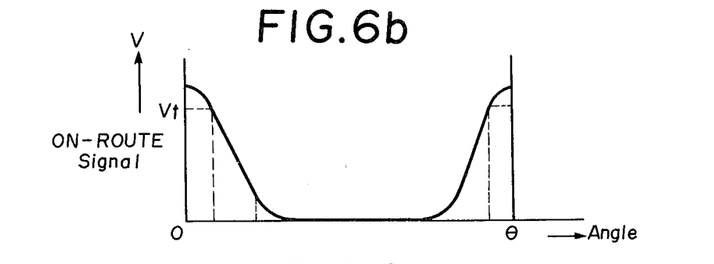
FIGS. 6b and 6c show respectively an on-route signal obtained from a route sensor, and a comparator output of the on-route signal in relation to the turning angle $\theta$ around the turning point.
Figure 6C:
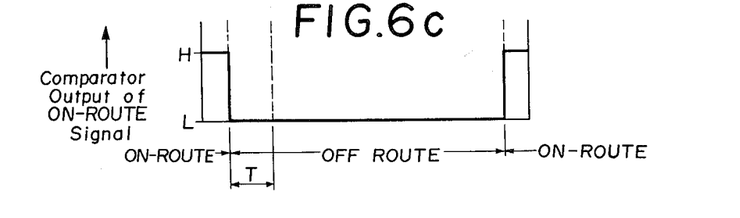
Figure 7:
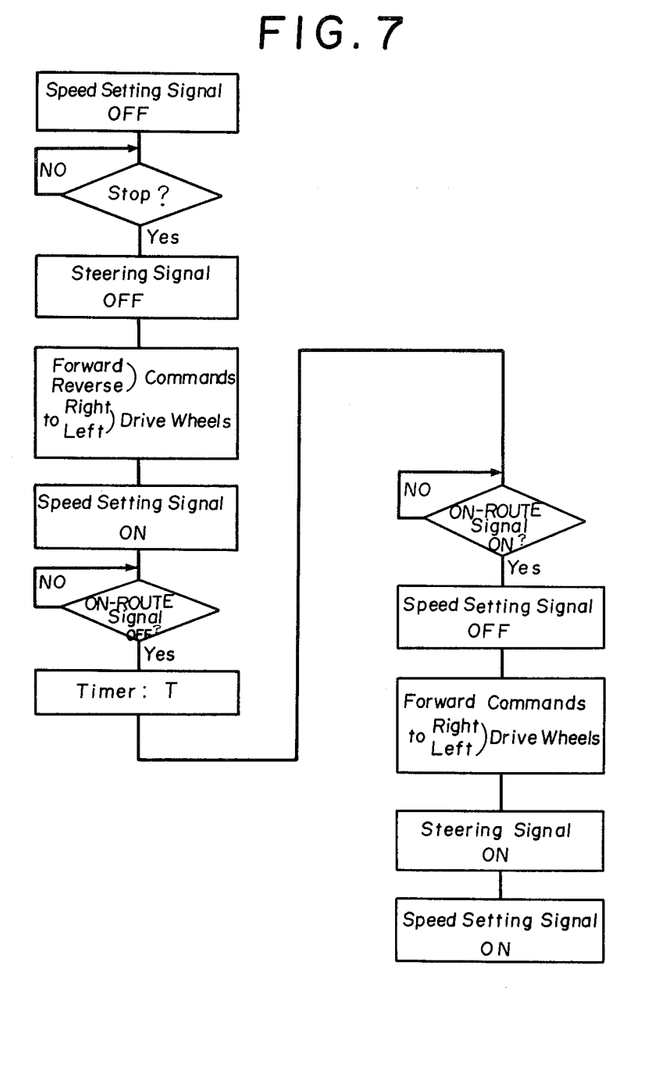
FIG. 7 is a flow chart illustrating a turning operation of the electromagnetically guided driverless vehicle.

FIGS. 6a to 6c are a similar schematic drawing and graphs to those of FIGS. 4a to 4c. FIGS. 6a to 6c are for the illustration of a process of changing the drive direction of the vehicle of a single conduction wire type, while FIGS. 4a to 4c are for the vehicle of a two conduction wires type. Since the principal process of changing the drive direction of the vehicle of the two types are basically the same with each other, only the difference between them is described hereinafter. In FIG. 6a, an old route A is made of a conduction wire 61 and a new route B is made of a conduction wire 62. The vehicle is assumed to turn to the left from the old route A to the new route B. It is to be noted here that the route sensor 63 detects high level H signals only twice, the first high level H signal being outputted when the route sensor 63 detects the magnetic field generated by the conduction wire 61, and the second or last high level H signal being outputted when the route sensor 63 detects the magnetic field generated by the conduction wire 62. In the flow chart of FIG. 7, which is here presented for the illustration of the process of changing the drive direction of the vehicle of a single conduction type, the difference from that shown in FIG. 5 resides in the omission of from the time T1 to the time T3 and in the provision of the time T in place thereof. This originates from the above fact that the sensor 63 detects only the two conduction wires 61 and 62 for the completion of turning to the new route.

Figure 8:
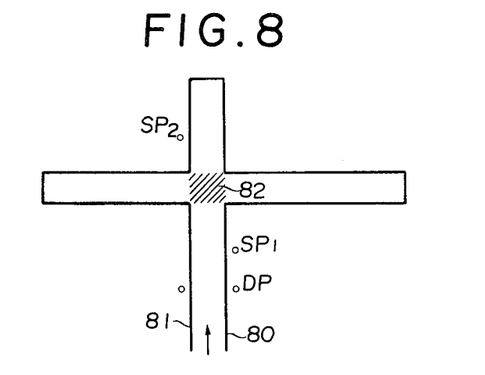
FIG. 8 is a schematic drawing illustrating a crossroads made of two parallel going conductor wires.

In FIGS. 1 to 7, the description of the present invention is directed to the process of changing the drive direction of the vehicle along the route where no crossroads or crossroutes exists. Referring to FIG. 8, the process for controlling the drive direction at a crossroads according to the invention is described. Although two conduction wires are used to settle a crossroads in FIG. 8, it is also possible to settle a crossroads by using a single conduction wire in which a portion of the single conduction wire is made insensible to a route sensor at the location where one single conduction wire crosses over another single conduction wire. Thus, it is appreciated that the process for controlling the drive direction at a crossroads according to the invention may be applied to both electromagnetically guided driverless vehicles of both types described above.

In FIG. 8, a route for the vehicle having a crossroads is constructed by two parallel going conduction wires 80 and 81, the crossroads designated generally at 82 being made insensible to the route sensor of the vehicle. In brief, according to the process for controlling the drive direction at a crossroads, the vehicle passes over the insensible region 82 by the force of inertia. After passing over the insensible region 82, the vehicle is driven to further run straight along the route, or the vehicle is once stopped and then driven to turn to the right or left in accordance with the process (a) to (i) previously described.

First, the straight running at the crossroads is described. The vehicle is assumed to run in a direction shown by an arrow, then at the place SP1 the vehicle is forced to inhibit the supply of a steering signal thereof supplied to the motor speed control device 5. Thereafter, the vehicle continues to run by the force of inertia and passes over the insensible region 82. During passing over the insensible region 82, the vehicle first detects the turn off of the on-route signal, and second detects the turn on of the on-route signal from its previous turn off state. Upon detection of the turn on signal, the steering signal is again supplied to the motor speed control device 5 in order to further drive the vehicle straight along the route.

When the vehicle is turned to either left or right direction at the crossroads, basically the vehicle is passed over the insensible region 82 with the steering signal inhibited at the place SP1 and by sensing the turn off and turn on of the on-route signal as described in the above straight running, and then is stopped at the place SP2 by turning off a speed setting signal. Upon completion of the above process, the turning operation is followed as similar to the steps (b) to (i) described in the embodiments shown in FIGS. 1 to 7. In this case, the detection step of the second high level H signal or the third high level H signal is selected dependent upon the vehicle types, that is, of a single conduction wire type or of a two conduction wires type, respectively. Since the latter type vehicle has a pair of route sensors 6 and 7, one of the route sensors 6 and 7 is chosen at the point DP depending upon the turning direction of the vehicle.

As appreciated from the foregoing description, the process for changing a running direction of an electromagnetically guided driverless vehicle has many adavantages over the prior art that the changing operation can be attained by one or two route sensors without providing other route sensors at the rear of the vehicle body. Moreover, by employing the process according to the invention, route design is extremely flexible due to the small turning space required for the vehicle.

While the preferred embodiments have been described, variations thereto will occur to those skilled in the art within the scope of the present invention which are delineated by the following claims.

What is claimed is:

1. A process for changing a running direction of an electromagnetically guided driverless vehicle, which is guided along a guide path comprising two parallel wire conductors, said guide path having at least one branch at a turning point, said turning point being located at the center of intersection of said branch and the main way of said guide path, said process being for use with a vehicle which includes right and left drive wheels rotatably mounted on said vehicle, axes of said drive wheels being in alignment with each other, right and left drive motors for driving said right and left drive wheels, respectively, right and left route sensors mounted on said vehicle for sensing magnetic fields induced by said wire conductors, said route sensors being disposed forwardly of said drive wheels and being disposed substantially in registry with said wire conductors, respectively, one output of said route sensors being used as a steering signal and as an on-route signal, and means responsive to said steering and on-route signals for controlling the direction and speed of rotation of each of said drive motors, said process comprising the steps of:

deenergizing said right and left drive motors to stop said vehicle at the turning point in such a manner that the axes of said drive wheels are generally in registry with said turning point;

subsequently driving said right and left drive motors to rotate said right and left drive wheels at the same speed in opposite directions, respectively, so that said vehicle moves angularly in the turning direction about a vertical axis passing through the middle point between said drive wheels;

subsequently detecting a first turn-off of said on-route signal;

subsequently detecting a first turn-on of said on-route signal;

subsequently detecting a second turn-off of said on-route signal;

subsequently detecting a second turn-on of said on-route signal; and subsequently deenergizing said right and left drive motors to stop the angular movement of said vehicle, so that said vehicle can move along the guide path in the new direction.

2. A process as defined in claim 1 for use with said vehicle in which said control means includes a steering control device and a motor speed control device, said steering control device generating forward and reverse commands for determining the respective directions of rotation of said drive motors, a speed setting signal for setting the speeds of rotation of said drive motors and a steering signal on-off command for enabling said speed setting signal, said motor speed control device energizing said drive motors in accordance with said steering signal, forward and reverse commands, speed setting signal and steering signal on-off command, said process further comprising the steps of:
(a) turning off said speed setting signal to stop said vehicle at the turning point in such a manner that the axes of said drive wheels are generally in registry with said turning point;
(b) subsequently supplying said steering signal off command to said motor speed control device;
(c) subsequently supplying said forward command to said motor speed control device to enable one of said drive wheels to rotate in the forward direction in accordance with the turning direction of said vehicle and also supplying said reverse command to said motor speed control device to enable the other of said drive wheels to rotate in the reverse direction;
(d) subsequently supplying said speed setting signal to said motor speed control device, so that said vehicle moves angularly in said turning direction about a vertical axis passing through the middle point between said drive wheels;
(e) subsequently detecting a first turn-off of said on-route signal;
(f) subsequently detecting a first turn-on of said on-route signal;
(g) subsequently detecting a second turn-off of said on-route signal;
(h) subsequently detecting a second turn-on of said on-route signal; and
(i) subsequently turning off said speed setting signal to stop the angular movement of said vehicle, so that said vehicle can move along the guide path in the new direction.

3. A process for changing a running direction of an electromagnetically guided driverless vehicle according to claim 2, wherein said process further comprises a step of inhibiting a reception of said on-route signal during a predetermined time after the detection of each of said first turn-off, first turn-on and second turn-off in the steps (e), (f) and (g), respectively.

4. A process for changing a running direction of an electromagnetically guided driverless vehicle, which is guided along a guide path comprising a single wire conductor, said guide path having at least one branch at a turning point, said turning point being located at the point of intersection of the wire conductor corresponding to said branch and the wire conductor corresponding to the main way of said guide path, said process being for use with a vehicle which includes right and left drive wheels rotatably mounted on said vehicle, axes of said drive wheels being in alignment with each other, right and left drive motors for driving said right and left drive wheels, respectively, a route sensor mounted on said vehicle for sensing magnetic field induced by said wire conductor, said route sensor being disposed forwardly of said drive wheels and being disposed substantially in registry with said wire conductor, an output of said route sensor being used as a steering signal and as an on-route signal, and means responsive to said steering and on-route signals for controlling the direction and speed of rotation of each of said drive motors, said process comprising the steps of:
deenergizing said right and left drive motors to stop said vehicle at the turning point in such a manner that the axes of said drive wheels are generally in registry with said turning point;
subsequently driving said right and left drive motors to rotate said right and left drive wheels at the same speed in opposite directions, respectively, so that said vehicle moves angularly in the turning direction about a vertical axis passing through the middle point between said drive wheels;
subsequently detecting a turn-off of said on-route signal;
subsequently detecting a turn-on of said on-route signal; and
subsequently deenergizing said right and left drive motors to stop the angular movement of said vehicle, so that said vehicle can move along the guide path in the new direction.

5. A process for changing a running direction of an electromagnetically guided driverless vehicle as defined in claim 4 for use with said vehicle in which said control means includes a steering control device and a motor speed control device, said steering control device generating forward and reverse commands for determining the respective directions of rotation of said drive motors, a speed setting signal for setting the speeds of rotation of said drive motors and a steering signal on-off command for enabling said speed setting signal, said motor speed control device energizing said drive motors in accordance with said steering signal, forward and reverse commands, speed setting signal and steering signal on-off command, said process further comprising the steps of:
(a) turning off said speed setting signal to stop said vehicle at the turning point in such a manner that the axes of said drive wheels are generally in registry with said turning point;
(b) subsequently supplying said steering signal off command to said motor speed control device;
(c) subsequently supplying said forward command to said motor speed control device to enable one of said drive wheels to rotate in the forward direction in accordance with the turning direction of said vehicle and also supplying said reverse command to said motor speed control device to enable the other of said drive wheels to rotate in the reverse direction;
(d) subsequently supplying said speed setting signal to said motor speed control device, so that said vehicle moves angularly in said turning direction about a vertical axis passing through the middle point between said drive wheels;
(e) subsequently detecting a turn-off of said on-route signal;
(f) subsequently detecting a turn-on of said on-route signal; and
(g) subsequently turning off said speed setting signal to stop the angular movement of said vehicle, so that said vehicle can move along the guide path in the new direction.

6. A process for changing a running direction of an electromagnetically guided driverless vehicle according to claim 5, wherein said process further comprises a step of inhibiting a reception of said on-route signal during a predetermined time after the detection of said turn-off in the step (e).

7. A system for changing a running direction of an electromagnetically guided driverless vehicle, which is guided along a guide path comprising two parallel wire conductors, said guide path having at least one branch at a turning point, said turning point being located at the center of intersection of said branch and the main way of said guide path, said system being for use with a said vehicle of the type having aligned right and left drive wheels rotatably mounted on vehicle axes and driven by right and left drive motors, there being right and left route sensors for sensing magnetic fields induced by said wire conductors and being mounted on said vehicle forwardly of said drive wheels and being disposed substantially in registry with said wire conductors, respectively, one of outputs of said route sensors being used as a steering signal and as an on-route signal, said vehicle further having control means responsive to said steering an on-route signals for controlling the direction and speed of rotation of each of said drive motors, and means for generating a turning signal immediately before said vehicle arrives at the turning point, said system comprising:

(a) means responsive to said turning signal for commanding said control means to deenergize said right and left drive motors to stop said vehicle at the turning point in such a manner that the axes of said drive wheels are generally in registry with said turning point;

(b) means for commanding said control means upon completion of said deenergization of the right and left drive motors to drive said right and left drive motors to rotate said right and left drive wheels at the same speed in opposite directions so that said vehicle moves angularly in the turning direction about a vertical axis passing through the middle point between said drive wheels; and (c) means responsive to a second direction of turn-on of said on-route signal for commanding said control means to deenergize said right and left drive motors to stop the angular movement of said vehicle, whereby said vehicle can move along the guide path in the new direction.

8. A system for changing a running direction of an electromagnetically guided driverless vehicle as defined in claim 7, for use with the said vehicle of the type in which its said control means includes a steering control device and a motor speed control device in which said steering control device generates forward and reverse commands for determining the respective directions of rotation of said drive motors, a speed setting signal for setting the speeds of rotation of said drive motors and a steering signal on-off command for enabling said steering signal, said motor speed control device energizing said drive motors in accordance with said steering signal, forward and reverse commands, speed setting signal and steering signal on-off command, said system comprising:

(a) means responsive to said turning signal for commanding said steering control device to turn off said speed setting signal to stop said vehicle at the turning point in such a manner that the axes of said drive wheels are generally in registry with said turning point;

(b) means for commanding said steering control device to generate said steering signal off command when said vehicle stops;

(c) means for commanding said steering control device to generate said forward and reverse commands to enable one of said drive wheels to rotate in the forward direction and to enable the other of said drive wheels to rotate in the reverse direction when said steering off command begins to be generated;

(d) means for commanding said steering control device to generate said speed setting signal when said forward and reverse commands begin to be generated, so that said vehicle moves angularly in said turning direction about a vertical axis passing through the middle point between said drive wheels;

(e) means responsive to a second detection of turn-on of said on-route signal for commanding said steering control device to turn off said speed setting signal to stop the angular movement of said vehicle, whereby said vehicle can move along the guide path in the new direction.

9. A system for changing a running direction of an electromagnetically guided driverless vehicle, which is guided along a guide path comprising a single wire conductor, said guide path having at least one branch at a turning point, said turning point being located at the intersection of the wire conductor corresponding to said branch and the wire conductor corresponding to the main way of said guide path, said vehicle comprising, right and left drive wheels rotatably mounted on said vehicle, axes of said drive wheels being in alignment with each other, right and left drive motors for driving said right and left drive wheels, respectively, a route sensor mounted on said vehicle for sensing magnetic field induced by said wire conductor, said route sensor being disposed forwardly of said drive wheels and being disposed substantially in registry with said wire conductor, an output of said route sensor being used as a steering signal and as an on-route signal, control means responsive to said steering and on-route signals for controlling the direction and speed of rotation of each of said drive motors, and means for generating a turning signal immediately before said vehicle arrives at the turning point, said system comprising:

(a) means responsive to said turning signal for commanding said control means to deenergize said right and left drive motors to stop said vehicle at the turning point in such a manner that the axes of said drive wheels are generally in registry with said turning point;

(b) means for commanding said control means upon completion of said deenergization of the right and left drive motors to drive said right and left drive motors to rotate said right and left drive wheels at the same speed in opposite directions so that said vehicle moves angularly in the turning direction about a vertical axis passing through the middle point between said drive wheels; and (c) means responsive to a first detection of turn-on of said on-route signal for commanding said control means to deenergize said right and left drive motors to stop the angular movement of said vehicle, whereby said vehicle can move along the guide path in the new direction.

10. A system for changing a running direction of an electromagnetically guided driverless vehicle as defined in claim 9, said control means comprising a steering control device and a motor speed control device, said steering control device generating forward and reverse commands for determining the respective directions of rotation of said drive motors, a speed setting signal for setting the speeds of rotation of said drive motors and a steering signal on-off command for enabling said steering signal, said motor speed control device energizing said drive motors in accordance with said steering signal, forward and reverse commands, speed setting signal and steering signal on-off command, said system comprising:

(a) means responsive to said turning signal for commanding said steering control device to turn off said speed setting signal to stop said vehicle at the turning point in such a manner that the axes of said drive wheels are generally in registry with said turning point;

(b) means for commanding said steering control device to generate said steering signal off command when said vehicle stops;

(c) means for commanding said steering control device to generate said forward and reverse commands to enable one of said drive wheels to rotate in the forward direction and to enable the other of said drive wheels to rotate in the reverse direction when said steering off command begins to be generated;

(d) means for commanding said steering control device to generate said speed setting signal when said forward and reverse commands begin to be generated, so that said vehicle moves angularly in said turning direction about a vertical axis passing through the middle point between said drive wheels;

(e) means responsive to a second detection of turn-on of said on-route signal for commanding said steering control device to turn off said speed setting signal to stop the angular movement of said vehicle, whereby said vehicle can move along the guide path in the new direction.

* * * * *